US009569406B2

(12) United States Patent
Shaver

(10) Patent No.: US 9,569,406 B2
(45) Date of Patent: Feb. 14, 2017

(54) ELECTRONIC CONTENT CHANGE TRACKING

(75) Inventor: Robert Shaver, Watertown, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1817 days.

(21) Appl. No.: 12/247,905

(22) Filed: Oct. 8, 2008

(65) Prior Publication Data

US 2014/0033088 A1    Jan. 30, 2014

(51) Int. Cl.
*G06F 17/21* (2006.01)
*G06F 17/22* (2006.01)

(52) U.S. Cl.
CPC ......... *G06F 17/212* (2013.01); *G06F 17/2288* (2013.01)

(58) Field of Classification Search
CPC ........................ G06F 17/212; G06F 17/2288
USPC .................... 715/229, 856, 810, 751
See application file for complete search history.

(56) References Cited

U.S. PATENT DOCUMENTS

| | | | | |
|---|---|---|---|---|
| 5,806,078 | A * | 9/1998 | Hug et al. | 715/205 |
| 5,983,242 | A * | 11/1999 | Brown et al. | |
| 6,014,135 | A * | 1/2000 | Fernandes | 715/744 |
| 2002/0107886 | A1 * | 8/2002 | Gentner et al. | 707/511 |
| 2003/0112273 | A1 * | 6/2003 | Hadfield et al. | 345/751 |
| 2003/0163537 | A1 * | 8/2003 | Rohall et al. | 709/206 |
| 2004/0205653 | A1 * | 10/2004 | Hadfield et al. | 715/530 |
| 2005/0138540 | A1 * | 6/2005 | Baltus et al. | 715/511 |
| 2006/0036960 | A1 * | 2/2006 | Loui | 715/764 |
| 2007/0244935 | A1 * | 10/2007 | Cherkasov | 707/203 |
| 2007/0260996 | A1 * | 11/2007 | Jakobson | 715/781 |
| 2007/0271303 | A1 * | 11/2007 | Menendez et al. | 707/200 |
| 2007/0271502 | A1 * | 11/2007 | Bedi et al. | 715/512 |
| 2008/0016091 | A1 * | 1/2008 | Chandra | 707/100 |
| 2008/0034327 | A1 * | 2/2008 | Cisler et al. | 715/854 |
| 2008/0059539 | A1 * | 3/2008 | Chin et al. | 707/203 |

(Continued)

OTHER PUBLICATIONS

Harald Weinreich and Winfried Lamersdorf. 2000. Concepts for improved visualization of Web link attributes. In Proceedings of the 9th international World Wide Web conference on Computer networks : the international journal of computer and telecommunications netowrking. North-Holland Publishing Co., Amsterdam, The Netherlands, The Netherlands, 403-4.*

(Continued)

*Primary Examiner* — Andrea Long
(74) *Attorney, Agent, or Firm* — Shook Hardy & Bacon LLP

(57) ABSTRACT

Apparatus, systems, and methods may operate to transmit and receive information, such as between a client and a server, that enables the display of a plurality of version indicators corresponding to a plurality of versions of electronic content, the plurality of versions comprising a first version newer than a second version. Further activities may include detecting selection of, and then displaying, a first selection indicator to indicate selection of the first version and a second selection indicator to indicate selection of the second version. Further activity may include communicate information to enable displaying, at substantially the same time as the first and second selection indicators, at least a portion of a plurality of changes between the first version and the second version. Additional apparatus, systems, and methods are disclosed.

15 Claims, 7 Drawing Sheets

(56) References Cited

U.S. PATENT DOCUMENTS

| | | | | |
|---|---|---|---|---|
| 2008/0172607 A1* | 7/2008 | Baer | .............................. | 715/255 |
| 2008/0183826 A1* | 7/2008 | Notani | .......................... | 709/206 |
| 2008/0307345 A1* | 12/2008 | Hart et al. | .................... | 715/769 |
| 2009/0013262 A1* | 1/2009 | Hamaguchi et al. | ......... | 715/751 |
| 2009/0083101 A1* | 3/2009 | Wall et al. | ........................ | 705/7 |

OTHER PUBLICATIONS

Andrew Willden "Track Changes in Word 2007" Central Washington University University Writing Center Fall 2007 2 pages.*

How to track and manage changes in Word 97 and in Word 2000 Feb. 1, 2007 3 pages http://support.microsoft.com/kb/326528.*

Randall Farrar 10 Proven Tips to Minimize Document Metadata in Microsoft Word Esquire Innovations, Inc. Jun. 2008 18 pages.*

Adobe Tips and Tricks Understanding Compare Documents using Adobe Acrobat 7.0 2005 4 pages.*

Digital Inspiration Use Google Docs to Compare Two Text Files Online Feb. 27, 2008 2 pages.*

Microsoft Support How to track and manage changes in a Word 2002 and a Word 2003 document Mar. 5, 2008 4 pages.*

Edward Mendelson "Adobe Buzzword beta" PC MAG Aug. 8, 2008 3 pages.*

Neil Randall Customizing Comments and Revisions Tracking in Microsoft Word PC Mag Oct. 7, 2008 6 pages.*

PC Advisor Google Docs free online word processor Jul. 16, 2007 2 pages.*

Eva LaMar SubEthaEdit Collaborative text editing Universally 2005 6 pages.* eHow.com How to Track changes in Microsoft Word Without Viewing Them Jun. 21, 2004 2 pages.*

Bob Doyle Online Office Space EContentmag.com Apr. 3, 2007 2 pages.*

Bill Camarda Using Microsoft Word 2002 Chapter 24 pp. 749-778 copyright 2001.*

Kyon Holman Using Network Manager to Deploy Firmware and Back/Restore Configuration Files DELL OpenManage Network Manager DELL Power Connect Nov. 17, 2003 35 pages.*

MouseHints The Computer Weekly Adobe Acrobat vol. 1, No. 10 2004.*

Josh Lowensohn 5 things you probably didn't know you could do in google Docs & Spreadsheets Jun. 20, 2007 2 pages.*

* cited by examiner

ELECTRONIC CONTENT CHANGE TRACKING

BACKGROUND

In many fields of endeavour, the content of electronic documents is viewed, reviewed, and revised. Over the lifetime of a document, then, numerous revisions can occur. Some of these revisions are saved, creating an archive history of various versions of the document. Thus, as the number of document versions increases, so does the complexity of tracking changes made to individual versions.

BRIEF DESCRIPTION OF DRAWINGS

Some embodiments are illustrated by way of example, and not limitation, in the figures of the accompanying drawings, in which.

DETAILED DESCRIPTION

Figure 1:
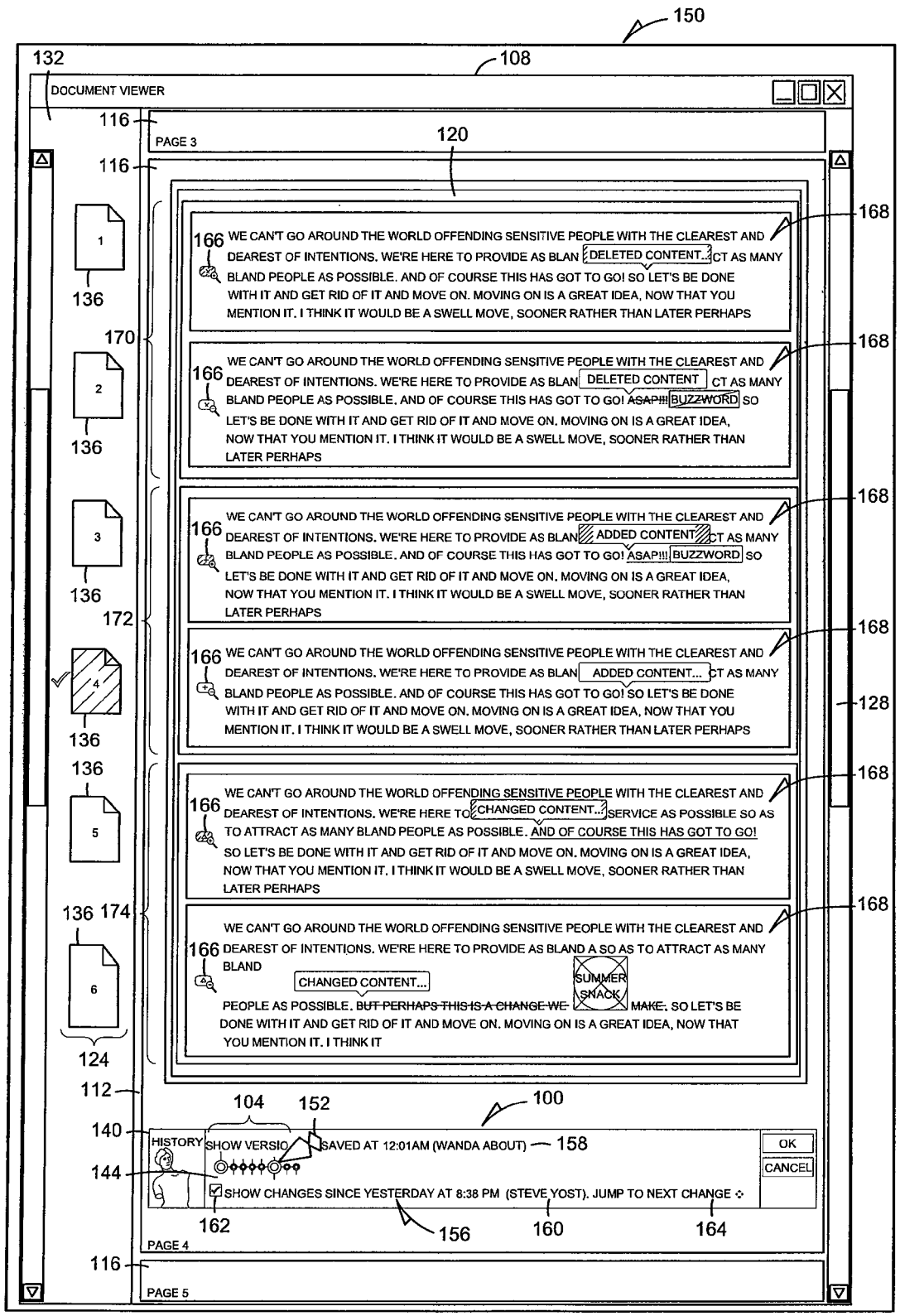
FIG. 1 illustrates the display of a file revision history along a time line with tracked changes as part of a graphical user interface (GUI), according to various embodiments.

Almost all word processing application programs operate to save the most current version of a document while it is being generated. Some of these applications permit saving prior versions as well, creating an archive of saved documents. The inventor has determined that changes between document versions can be more easily monitored by displaying a time line of the versions in conjunction with the tracked changes. This mechanism can lead to more efficient document review operations, especially in situations when several writers and editors are involved.

For the purposes of this specification, the term "electronic content" includes any digital data that may be presented to a user (e.g., visually or audibly presented), such as an electronic document, page-descriptive electronic content such as a page-descriptive electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as pieces of electronic text or other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings, and other electronic content elements. An example of a rendering module includes a web browser component (e.g., Microsoft Internet Explorer) or other component to render electronic content such as HTML pages. Another example of a rendering module includes the ADOBE® ACROBAT® electronic publishing program.

The term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

It is common for one or more users (or other actors, such as automated processes) to view, review, and revise electronic content. In some embodiments, a review may be carried out by one person or by a team including multiple persons.

When viewing, reviewing, or revising, a user may start up an application (e.g., a rendering module) to render or otherwise present electronic content. This electronic content may take a variety of forms, such as an electronic document, an audio file, video file, sequence of images, dynamic content, combinations thereof, and other forms of electronic content.

During the course of this activity, the user may be presented with a rendering of various content elements (e.g., using an output device, such as a display) included or otherwise associated with the electronic content. In some embodiments, these content elements may be presented in a sequential order so as to indicate their positions or interrelationships within the electronic content, or for ease of user perception.

Various types of content elements contained within electronic content may be presented to a user on an output device in various ways according to the nature of the content elements and/or the preferences of users. For example, electronic content representing an electronic document may be presented on a display screen in the form of renderings of pages as they might appear if the electronic document were to be printed out. In some such embodiments, the user may use a mouse, keyboard, touch pad, voice input or other input devices to explore the electronic document. The application may provide such affordances as scroll bars, fast forward/reverse scan buttons, or other GUI elements to be manipulated by the user to carry out exploration of the electronic document. This exploration may be used when the entire electronic document is too large to conveniently display on a computer screen at one time.

While reviewing or revising electronic content that includes content elements, the user may wish to record or otherwise keep track of a particular state of revision. One way of tracking this state is by saving a version of the electronic content, and adding it to the content archive history. It is the management of these versions of stored content that form the archive history, along with monitoring the differences between them, that is addressed by the various mechanisms described herein.

FIG. 1 illustrates the display of a file revision history 100 along a time line 104 with tracked changes as part of a GUI 108, according to various embodiments. The GUI 108 shows an example of a GUI viewport 112 window that may be displayed by a reviewing application to present renderings of electronic content in the form of an electronic document 124 that includes several pages 116 of information 120.

The viewport 112 permits a reviewer to see some or all of the document 124; typically, only a portion is shown. As shown, all of one page 116 (page 4) and parts of other pages 116 (page 3 and page 5) are visible. On the right hand side of the GUI 108, a scroll bar 128 may be provided for a user/reviewer to scroll through renderings of the various pages 116 of the electronic document 124. The left hand side of the GUI 108 may include a reviewing pane 132 populated by thumbnail or iconic images 136 representing various pages in the electronic document 124.

In most embodiments, an end-user or "user" of a document processing application constructed to operate according to the principles disclosed herein can access various versions of the document 124 (with the exception of the working version) by clicking on a history icon 140. The history icon 140, as well as the time line 104, may form a part of the GUI 108 display associated with a document processing program, and can be located anywhere in the GUI 108, as desired. The history icon 140 and time line 104 are located in the lower left or lower right corner of a display screen 150.

Executing the command represented by the icon 140 has the effect of presenting the time line 104 that includes the most recent version 144, and all past versions (e.g., those versions that are on the time line 104, and do not include the most recent version 144), to the user. In some cases, the current version is shown as being selected at the far left of the time line 104, and as a mouse or other user-controlled pointing device is moved to hover a pointer 152 over each indicated version on the time line 104, a message 156 is displayed to show the identity of the person that created that version, and the time at which it was created (e.g., when it was saved). If the pointing device is "clicked" or otherwise actuated to indicate a selection, the particular version of the document selected (here, the current version) is presented for viewing.

It should be noted that adding a comment to a document 124 does not operate to generate a new version of the document 124 when the document 124 is saved. Separate versions of a document 124 arise upon saving the document 124 when changes to the text or other content of the document 124 is made. Thus, in most cases, even though many people may have added comments to a document 124, there may be only one version of that particular document 124, assuming no other content in the document is changed.

As a document 124 is edited, various versions can be saved locally, or on a server. Each version is a snapshot of the entire document 124, including merged comments from reviewers. Saving the document 124 can be triggered in many ways, including receiving an explicit "save" command from a user, or by an application program auto-save mechanism which is not directly controlled by the user.

Each time a document's contents 120 are saved (e.g., explicitly or via auto-save), they can be saved as a new version, rather than overwriting the previous version. Versions may be maintained in the archive history 100 along with the date-time when they were saved (created), and the identity of the user who saved them.

The difference display, which is a display of changes between the two versions, can selectively be turned on or off. In addition, the versions to be used for a difference display can be selected, and when the difference display is active, there is the ability to jump from one change to the next throughout the document 124.

Figure 7:
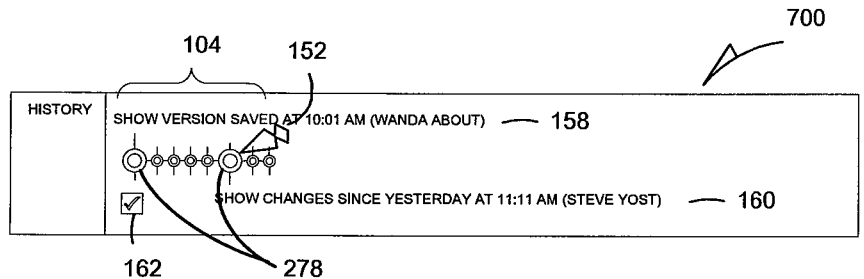
FIG. 7 illustrates tracking changes between multiple versions along a file revision history time line according to various embodiments.
Figure 7:
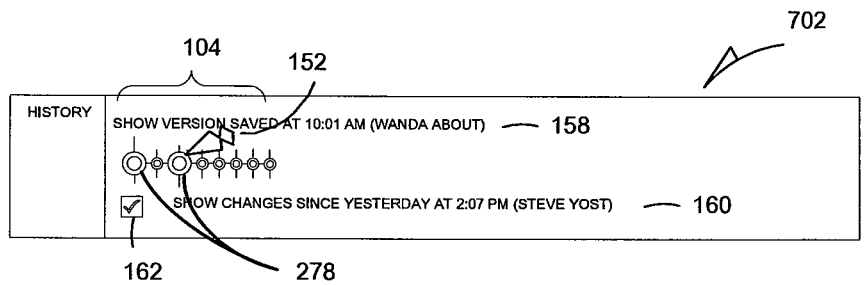
Figure 7:
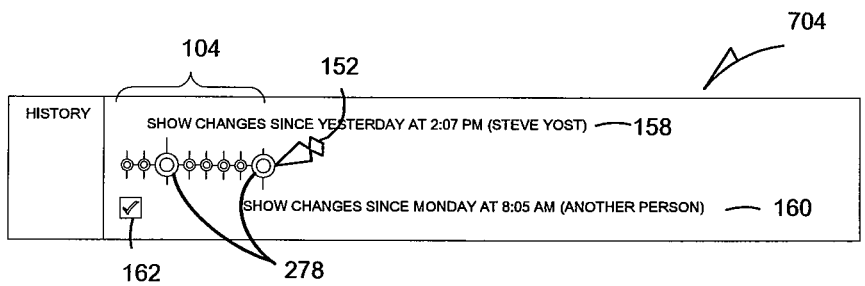

In the example GUI 108, the ability to select a first (e.g., more recent) version 158 and a second (e.g., older) version 160 is provided. Information describing the time, date, and author of the first version 158 is shown above the time line 104, while the information describing the time, date, and author of the second version 160 is shown below the time line 104. However, various embodiments are not to be so limited. Using a mouse-over and click command, each version 158, 160 can be dynamically selected, one at a time. FIG. 7, described below, has a more detailed description of time line 104 operations.

A "Show Changes" checkbox 162 may be displayed in conjunction with the second version 160 (which may be displayed directly above the checkbox 162, so that the checkbox 162 is positioned beneath the default second version 160 even when unchecked), and a "Jump to next change" link 164 may also be displayed. The default second version 160 may be chosen as the version that was last viewed by the current user, if desired.

Both the upper and lower tracks of the history bar 100 can be live for setting the first (e.g., current) version 158 and the second (e.g., prior) version 160. Using a mouse over operation, the version highlight and label can be made to change to show the version that will be selected for viewing if the mouse is clicked. The reader should note that the second version track does not exist directly beneath or to left of the first version track, since designers of many embodiments may decide that prior versions cannot be selected as a "more recent version" than the first version.

When the "Show Changes" checkbox 162 is checked (as shown in FIG. 1), differences between the two selected versions 158, 160 are indicated by change markers 166 and content markup 168. Many different change markers 166 can appear. In some embodiments, the shapes and/or colors of the change markers 166 correspond to the three major types of changes: content changes, style and/or meta data changes, and comment changes.

In addition to indicating the presence of changes at a particular point in the document 124, change markers 166 can be interactive, as part of the GUI 108. For example, using a mouse over operation, additional information can be displayed about a selected change using a popup bubble or balloon. If the user clicks on the selected change marker 166, the change marker 166 displayed may then be shown in outline form, and the original content/style may be restored and presented in the document 124. In other words, the display of the change may revert to what was originally included in the second version 160. The display of the change marker 166 can be toggled, so that clicking on the change marker 166 after reversion will result in restoring the display to what is shown in the first version. This type of operation can be applied to many types of changes.

For example, the content 120 may be deleted, as shown in the first portion 170 of Page 4 in the document 124. In the upper pane of the first portion 170, the change marker 166 indicates that content 120 has been deleted by including an "X" in the change marker 166 itself. The change marker 166 also includes a small magnifying glass with a plus sign as part of the lens, to indicate that the changes associated with the first version 158 are displayed. A display bubble forms part of the markup 168 that indicates the location of the deleted material within the content 120 of the page 116. The display bubble may be colored red to indicate deletion.

In the lower pane of the first portion 170, the change marker 166 indicates that content has been deleted by including an "X" in the change marker itself. The magnifying glass in the change marker 166 in this case includes a minus sign as part of the lens, to indicate that the changes associated with the second version 160 are displayed. The display bubble that forms part of the markup 168 and indicates the location of the deleted material within the content 120 can still be colored red to indicate deletion, but is now shown in outline form (as is the associated change marker 166) to indicate that the deleted material is now displayed.

In another example, as shown in the second portion 172 of Page 4 in the document 124, the change marker 166 indicates that content 120 has been added. In the upper pane of the second portion 172, the change marker 166 indicates that content 120 has been added by including a plus sign in the change marker 166 itself. The change marker 166 also includes a small magnifying glass with a plus sign as part of the lens, to indicate that the changes associated with the first version 158 are displayed. A display bubble forms part of the markup 168 that indicates the location of the added material within the content 120 of the page 116. The display bubble may be colored green to indicate that the added material is now displayed.

In the lower pane of the second portion 172, the change marker 166 indicates that content has been added by including a plus sign in the change marker itself. The magnifying glass in the change marker 166 in this case includes a minus sign as part of the lens, to indicate that the changes associated with the second version 160 are displayed. The display bubble that forms part of the markup 168 and indicates the location of the added material within the content 120 can still be colored green to indicate addition, but is now shown in outline form (as is the associated change marker 166) to indicate the added material is no longer displayed.

In another example, as shown in the third portion 174 of Page 4 in the document 124, the change marker 166 indicates that content 120 has been changed. In the upper pane of the third portion 174, the change marker 166 indicates that content 120 has been added by including an upward-pointing arrow in the change marker 166 itself. The change marker 166 also includes a small magnifying glass with a plus sign as part of the lens, to indicate that the changes associated with the first version 158 are displayed. A display bubble forms part of the markup 168 that indicates the location of the changed material within the content 120 of the page 116. The display bubble may be colored blue to indicate that the changed material is now displayed.

In the lower pane of the third portion 174, the change marker 166 indicates that content has been changed by including an upward-pointing arrow in the change marker itself. The magnifying glass in the change marker 166 in this case includes a minus sign as part of the lens, to indicate that the changes associated with the second version 160 are displayed. The display bubble that forms part of the markup 168 and indicates the location of the changed material within the content 120 can still be colored blue to indicate that changes have occurred, but is now shown in outline form (as is the associated change marker 166) to indicate that the changed material is now displayed (e.g., in this case, content that has been deleted is now displayed, and content that has been added is no longer displayed).

While both the upper and lower panes of each portion 170, 172, 174 are shown in FIG. 1, the reader is asked to note that this has been done as a matter of convenience, and does not reflect what actually occurs in most embodiments. That is, in most cases, only one of the panes in each portion 170, 172, 174 will actually be shown at a time. This is because the user will normally toggle the associated change marker to display only the content associated with the first version (e.g., in the upper pane) or the content associated with the second version (e.g., in the lower pane) at a particular time. Of course, this may vary with the state of each change marker 166, so that a user may elect to view the upper pane of the first portion 170, and the lower pane of the second portion 172 at the same time, for example.

Figure 2:
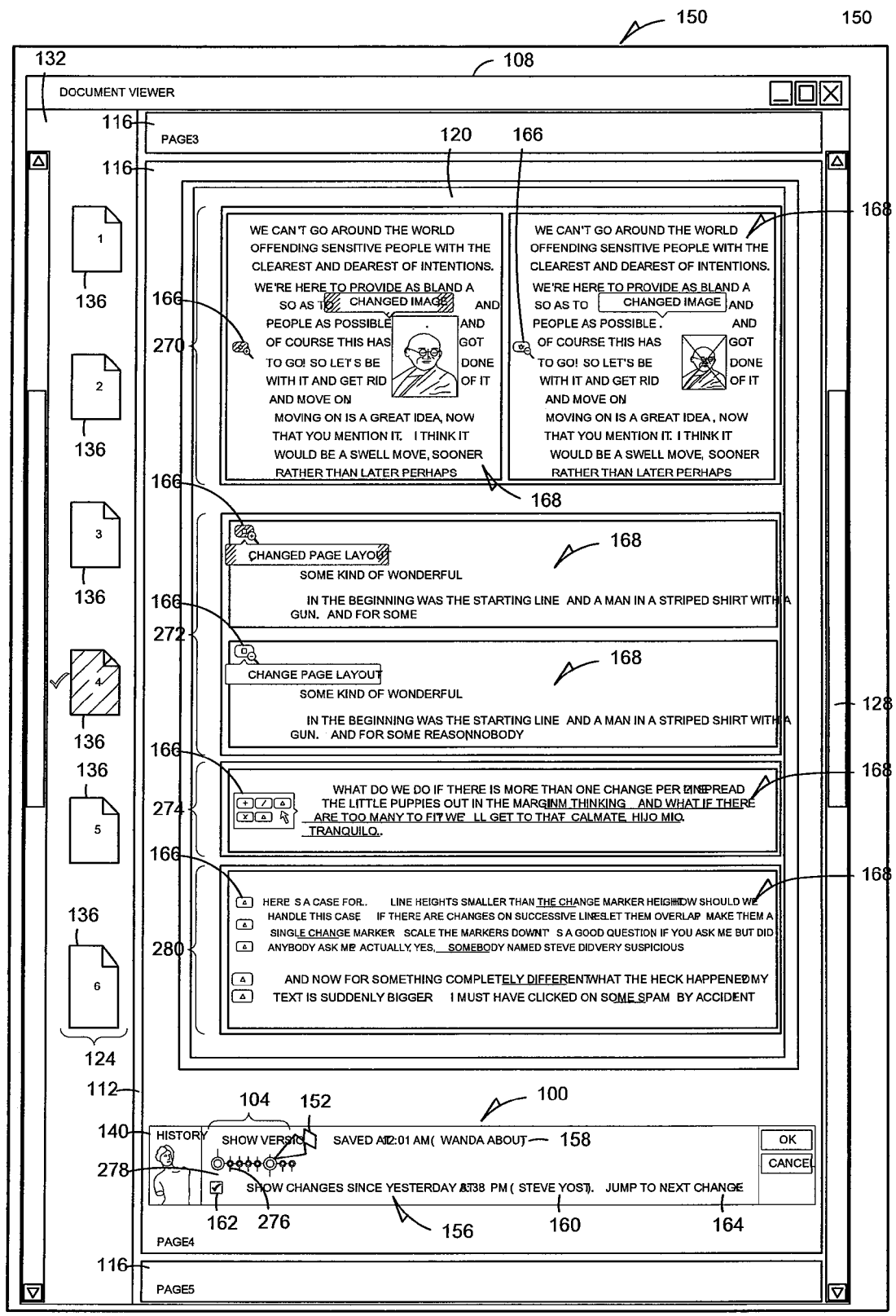
FIG. 2 illustrates the display of a file revision history along a time line along with additional tracked changes as part of a GUI, according to various embodiments.

FIG. 2 illustrates the display of a file revision history 100 along a time line 104 along with additional tracked changes as part of a GUI 108, according to various embodiments. As is shown in FIG. 1, versions along the time line 104 can be indicated using version indicators. Here in FIG. 2, the version indicators comprise a dot version indicator 276, indicating one of several versions on the time line 104, and a circle version indicator 278, to indicate a version on the time line 104 that has been selected by the system and/or a user. Other graphic figures can be used as version indicators.

The version indicators 276, 278 may have a color associated with the user whose work was saved in that version.

The color may refer to a color assigned to each user in a document sharing list. If a particular version was saved by a user no longer present on the document sharing list, the version indicator 276, 278 may have a gray color. If a version is selected by virtue of an action on the part of the user (e.g., the mouse controlling the pointer 152 is clicked), then the version selected may be used to replace the current version of the document 124 displayed in the GUI 108. Selected areas and scrolling are maintained, if possible. Many other types of version change markers may be employed.

For example, the content 120 may comprise images that have been changed, as shown in the first portion 270 of Page 4 in the document 124. In the left-hand pane of the first portion 270, the change marker 166 indicates that content 120 has been changed (in this case, an image has been enlarged) by including a star in the change marker 166 itself. The change marker 166 also includes a small magnifying glass with a plus sign as part of the lens, to indicate that the changes associated with the first version 158 are displayed. A display bubble forms part of the markup 168 that indicates the location of the changed material within the content 120 of the page 116. The display bubble may be colored black to indicate an image change.

In the right-hand pane of the first portion 270, the change marker 166 indicates that content has been changed by including a star in the change marker itself. The magnifying glass in the change marker 166 in this case includes a minus sign as part of the lens, to indicate that the changes associated with the second version 160 are displayed. The display bubble that forms part of the markup 168 and indicates the location of the changed material within the content 120 can still be colored black to indicate change, but is now shown in outline form (as is the associated change marker 166) to indicate that the material that was changed (in this case, the original, unchanged, reduced size image) is now displayed.

In another example, as shown in the second portion 272 of Page 4 in the document 124, the change marker 166 indicates that the page layout for the content 120 has been added. In the upper pane of the second portion 272, the change marker 166 indicates that a page layout change has been made by including an open box in the change marker 166 itself. The change marker 166 also includes a small magnifying glass with a plus sign as part of the lens, to indicate that the layout associated with the first version 158 are displayed. A display bubble forms part of the markup 168 that indicates the page layout corresponds to Page 4 of the document 124. The display bubble may be colored black to indicate that the changed format is now displayed.

In the lower pane of the first portion 170, the change marker 166 indicates that the page layout for the content 120 has been changed by including an underline symbol in the change marker itself. The magnifying glass in the change marker 166 in this case includes a minus sign as part of the lens, to indicate that the layout associated with the second version 160 are displayed. The display bubble that forms part of the markup 168 and indicates the location of the layout change within the content 120 can still be colored black to indicate a change, but is now shown in outline form (as is the associated change marker 166) to indicate that the original, unchanged format is now displayed.

While various colors, shapes, and symbolic indicators have been described, the various embodiments are not to be so limited. Thus, for example, it should be generally noted that the shapes/colors included in the change markers 166 can be used to indicate grouped change types, such as content changes, style/meta data changes, and comment changes, as shown. Other groupings are possible.

The page layout change markers 166, which apply to the entire page, may be located in the upper left corner of the first page of the document in some embodiments. In most embodiments, the change markers 166 are placed in the left hand margin of the page and aligned substantially vertically with the top of the deleted/added/changed element. If the left hand margin of the document 124 is not wide enough to accommodate the change markers 166, then the markers 166 may be moved as far to the left as possible, perhaps into the gutter on the left-hand side of the page. In some embodiments, the change markers 166 are displayed on the right-hand side of the page 116, and moved far to the right of the right-hand margin if the margin on the right-hand side of the page 116 is not large enough to accommodate them.

If more than one change marker 166 occurs at approximately the same vertical location, the plurality of markers can be arranged approximately evenly across the available horizontal margin space, working from left to right in the same order that the changes occur in the document 124. If there is insufficient horizontal space to accommodate all the change markers for a given line, as shown in the third portion 274 of the page, then the markers can overlap, or be arranged in both horizontal and vertical rows (as shown in FIG. 2). If the markers 166 are permitted to overlap (not shown), a mouse over operation can operate to spread them out vertically to permit user interaction with each individual marker, perhaps using a mouse click operation to select one of the markers at that location. Change markers for headers and footers may be displayed in conjunction with the first page in which the header/footer appears.

As is shown in the fourth portion 280 of Page 4 of the document 124, change markers can be scaled down from their usual size if the line height they occur on is too small to accommodate the standard marker size. If the line height changes to a larger size, perhaps because of an increase in font size, the size of the change markers 166 can likewise be scaled up.

Finally, to view changes in succession, the user can click on a "Jump to next change" link to move to the next change that follows the current content selection/insertion point. The markup bubble for the change is then displayed. The bubble for each change may also be displayed upon mouse over operations for each change marker 166. That is, if the mouse is not located over any change markers 166, then the markup 168 for the content 120 is not displayed. However, if the mouse hovers over a change marker 166, then the markup 168 for that particular change marker 166 will be displayed. Thus many embodiments may be realized.

Figure 3:
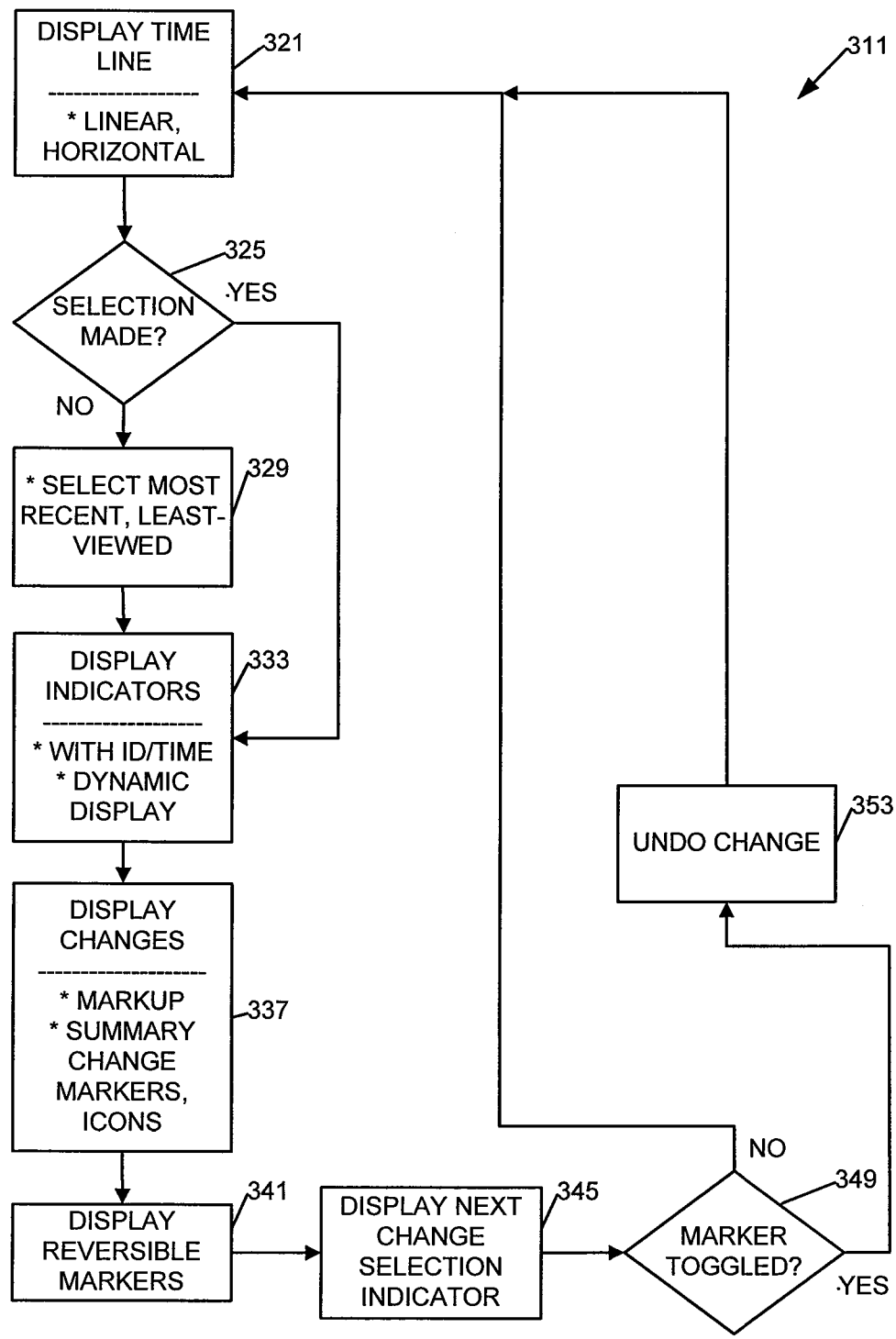
FIG. 3 is a flow diagram illustrating several methods according to various embodiments.

For example, FIG. 3 is a flow diagram illustrating several methods 311 according to various embodiments. In some embodiments, a method 311 of displaying changes between versions of electronic content may begin at block 321 with transmitting information to a receiving entity to enable displaying a time line comprising a plurality of version indicators corresponding to a plurality of versions of electronic content. The plurality of versions of electronic content comprise a first version newer (in time) than a second version.

It should be noted that in every case where the activity of "displaying" is related, information may be communicated (e.g., transmitted and received) between a variety of entities to enable such display activity. For example, a server may transmit information to a receiving entity, such as one or more clients or workstations, to enable displaying the various visual elements described.

Thus, the method 311 may include transmitting information to a receiving entity to enable displaying the time line at block 321, which in turn may comprise displaying the time line as a substantially linear (e.g., horizontal, as shown, or vertical or angled) arrangement of the plurality of version indicators, each one of the plurality of version indicators comprising a substantially similar shape that is spaced apart from others of the plurality of version indicators along the time line. The time line can be displayed as a history bar with a plurality of database versions using shapes as version indicators positioned along a line, with the versions spaced apart along the line. The shapes representing version indicators may include vertical bars; or square, circular, triangular, or elliptical icons. The version indicators may be substantially equally spaced apart along the time line.

The method 311 may continue on to block 325, to determine whether one or both of the first version and second version have been selected by a user. For example, a computer system operating a graphical user interface to display the version indicators, perhaps in the form of a time line, may have detected that a user has selected the third and fourth most-recent versions of a document, using a mouse, as the first and second versions, respectively. Other versions may be selected.

If a selection of both versions has been made and/or detected, then the method 311 may continue on to block 333. Otherwise, the method 311 may include, at block 329, selecting from the plurality of versions, as the first version, a most recent version. In addition, the method 311 may include selecting from the plurality of versions, as the second version, a version last-viewed by the current user.

This is just one example of how default versions for viewing changes can be selected by the system. In this case, the most recent version and the version last-viewed by the current user have been chosen as the first and second versions. Thus, the default comparison for a current user may be set up to automatically display all changes that have occurred since they last viewed the electronic content. Other versions may be chosen for default viewing, in lieu of an explicit user selection, as noted previously.

At block 333, the method 311 may comprise transmitting information to the receiving entity to enable displaying a first selection indicator to indicate selection of the first version and a second selection indicator to indicate selection of the second version. This activity may include displaying the first selection indicator or the second selection indicator, or both, in conjunction with information indicating at least one of an associated user/personal identity or a save time. That is, selection indicators can be displayed along with an identification of the person that saved the selected version, the date/time the version was saved, or both, for example.

Further activity at block 333 may include dynamically displaying the information associated with a selected one of the plurality of versions as cursor hover activity (e.g., as the result of a mouse over operation) proximate to the selected one of the plurality of versions is detected. Thus, as the cursor hovers over versions along the time line, the identity/save time information display may follow the cursor location, and the information may change to reflect the version on the time line nearest to the cursor location.

The method 311 may go on to block 337 to include transmitting information to the receiving entity to enable displaying, at substantially the same time as the time line and the first and second selection indicators, at least a portion of a plurality of changes between the first version and the second version. That is, the time line, the selection indicators, and the changes between the two versions indicated by the selection indicators may all be displayed simultaneously on a display screen, perhaps as part of a GUI. Thus, while the existence of multiple versions may be shown on the time line, the two versions selected for comparison are specifically indicated. The activity at block 337 may include displaying an indication of content markup associated with the electronic content forming part of the portion displayed.

The method 311 may include, at block 341, transmitting information to a receiving entity to enable displaying reversible summary change markers which, when selected, operate to undo the current change with which they are associated. In this way, individual changes can be displayed along with a corresponding change marker that can be repeatedly selected to toggle between visibly indicating undoing and redoing the change.

Change markers can be displayed in a variety of ways, other than, or in addition to the reversible implementation described above. For example, in some embodiments, a different summary change marker for each change in the portion displayed may be shown, the change marker to indicate, via an icon, the type of content change that has been implemented. Thus, a change marker for each change displayed as part of the current document window can be shown along with an icon to indicate the type of change that has been made.

In some embodiments, the method 311 may also include displaying a reversible change display indicator that can be selected to turn display of changes in the portion (e.g., of a document shown in the current display window) on or off at block 345. In this way, the changes can be displayed using a change display indicator (e.g., comprising a check box, as shown in the figures), or some other device that can be selected as part of a GUI to alternate between displaying changes, and not displaying changes.

Variations in the basic display of changes are included in some embodiments. For example, the method 311 may include, as part of block 345, transmitting information to a receiving entity to enable displaying a "next change" selection indicator to receive display selections of a proximate change in the electronic content that comprises one of a prior change or a subsequent change with respect to a currently displayed change. For example, a change selection indicator can be selected by the user in order to jump to the next change in a sequence of changes with respect to the current change highlighted and shown as part of the changes in the electronic content. Jumping to previous changes, in sequence, may also be selected. In this way, the user may have the option of selecting either forward or reverse sequential movement throughout the content, from change to change, as the changes are reviewed.

The method 311 may continue on to block 349, with determining whether a change marker has been toggled, perhaps received as input from the user. Thus, the activity at block 349 may include receiving a toggle change selection associated with one of the summary change markers to undo a change represented by the summary change marker that has been selected. That is, changes may be undone and redone using a toggle selection associated with each change marker.

The electronic content may comprise a document, such as a word processing document, text, drawings, a data file, a spreadsheet, audio recordings, video recordings, multimedia presentations, and other types of content. Documents may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006. Many other embodiments may be realized.

Figure 4:
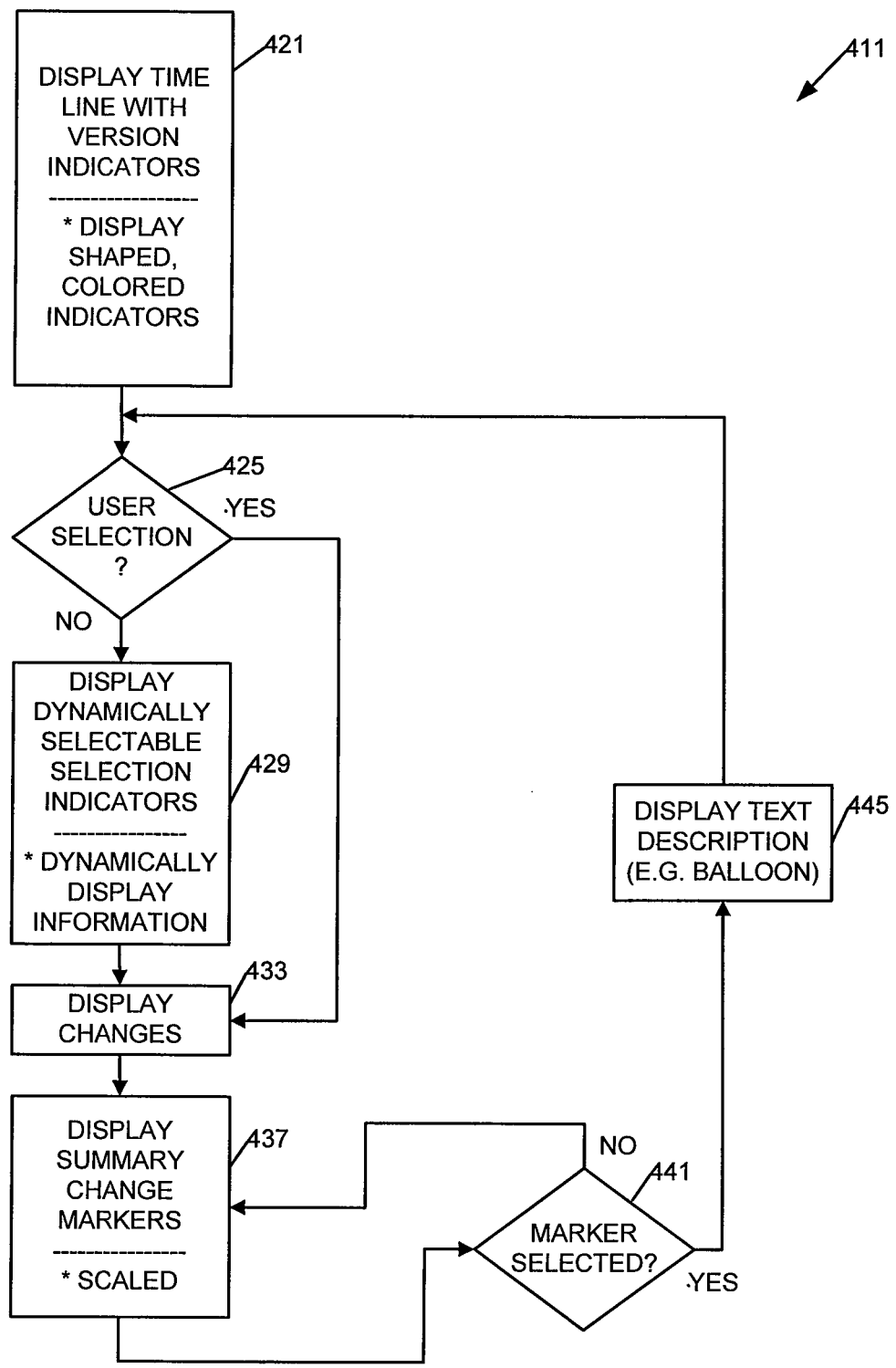
FIG. 4 is a flow diagram illustrating several additional methods according to various embodiments.

For example, FIG. 4 is a flow diagram illustrating several additional methods 411 according to various embodiments. Communication between transmitting and receiving entities (e.g., servers transmitting to clients) may occur to enable the display of various visual elements, in a manner similar to or identical to that noted with respect to the methods discussed with respect to FIG. 3.

For example, a method 411 of displaying electronic content version change history may begin at block 421 with transmitting information to a receiving entity to enable displaying a substantially linear time line comprising a plurality of version indicators having a substantially similar shape corresponding to a plurality of versions of electronic document content. As noted previously, the plurality of versions comprises a first version newer than a second version.

The activity at block 421 may include displaying each one of the plurality of version indicators in conjunction with a color associated with each one of a group of users, wherein the color corresponds to the identity of a user in the group that last saved a corresponding version of the electronic document content. Thus, the version indicators along the time line can be color-coded to associate users with versions of the content.

As was the case with the methods 311 in FIG. 3, the methods 411 of FIG. 4 may include the display of changes between user-selected versions, or default (e.g., system-selected) versions. For example, the method 411 may include, at block 425, establishing selection of one of the first version or the second version, or both, responsive to receiving a user selection indication. Thus, the user identity/save time information can be dynamically displayed in conjunction with mouse/touch pad cursor hover activity for any of the versions, and the user may select the version for which information is displayed as one of the first version or the second version by clicking on the mouse, or tapping a touch pad in the vicinity of the version to be selected, for example.

If an explicit selection has been made and/or detected for both versions, then the method 411 may continue on to block 433 to transmitting information to the receiving entity to enable displaying the changes between versions. Otherwise, the method 411 may include, at block 429, transmitting information to the receiving entity to enable displaying a dynamically-selectable first selection indicator on one side of the time line to indicate selection of the first version and a dynamically-selectable second selection indicator on another side of the time line to indicate selection of the second version. In this case, the selection indicators may each be dynamically-selectable, with the newer version and the older version on opposite sides of the time line.

"Dynamically selectable" means that cursor movement in the proximity of one of the version indicators is sufficient to initiate information display activity with respect to that particular version indicator. For example, a lead line may follow the cursor from version to version, as the cursor hovers over various versions. Similarly, information identifying a user/save time may follow the cursor, and the information may change dynamically with respect to the associated version as the cursor moves from version to version. "Cursor movement" occurs when the cursor moves from one location in space (along at least one dimension) with respect to the current display, to another location in space with respect to the current display, and is not substantially stationary.

In some embodiments, the information associated with the selected versions may be dynamically displayed in a particular manner. For example, the activity at block 429 may include dynamically displaying information associated with a selected one of the plurality of versions as cursor hover activity proximate to the selected one is detected.

The information associated with the first version may be displayed above the time line, and the information associated with the second version may be displayed below the time line. Thus, information regarding the different versions can be displayed so that the newer version information is above the time line, and the older version information is below the time line, and vice-versa.

The activity at block 429 may include transmitting information to the receiving entity to enable displaying selected version indicators corresponding to the first version and the second version using a first type of shape and/or color, and displaying the remainder of the plurality of version indicators as a second type of shape and/or color different from the first type of shape and/or color. In this way, the first and second version indicators can be displayed using shapes and/or colors that differ from the rest of the version indicators on the same time line. For example the first and second version indicators can be displayed using empty or partially-filled shapes, while the balance of the version indicators can be shown using filled shapes (e.g., see FIG. 2), and vice-versa.

The method 411 may go on to include transmitting information to the receiving entity to enable displaying, at block 433, at substantially the same time as the time line and the first and second selection indicators, at least a portion of a plurality of changes between the first version and the second version. This displayed portion is usually, but not always, limited to the number of pages that a user may comfortably view on a single display screen.

The method 411 may continue on to block 437 with transmitting information to the receiving entity to enable displaying summary change markers in a one-to-one correspondence with changes in the electronic document content forming the portion of the document that is displayed. Thus, each change in the displayed content can be reflected by a corresponding summary change marker.

In some embodiments, the summary change markers comprise substantially similar shapes, and at least one of a color or an icon corresponding to a change type. In this way, the summary change markers may have a color and/or icon that indicates a change type, to include categorizing the changes using color to indicate major change types, such as changes to content, style/meta data, or comment; and an icon to indicate the particular type of change, such as adding text, deleting an image, changing a font style, etc. The shape may be filled to indicate first version (current) content display, or empty to indicate second (prior) version content display, or vice-versa.

In some embodiments, the activity at block 437 may comprise transmitting information to the receiving entity to enable displaying a subset of the summary change markers along lines of the electronic document content corresponding to the lines including changes summarized by the subset.

This permits the change markers to be displayed on the same lines as the changes to which they correspond.

If there are too many change markers to display on a single line, or the markers will not fit into the document margin, the activity at block 437 may comprise transmitting information to the receiving entity to enable displaying summary change markers in a group to indicate changes in the electronic document content. The change markers may have a size individually scaled according to at least one of a font size or a line height of the electronic document content. In this way, the change markers can be scaled in size, according to the size of the text or line height of the document proximate to their display locations. To further economize on space used to display the summary change markers, a balloon or other grouping mechanism (e.g., overlapping or partially hiding some summary change markers behind other summary change markers) can be used to reduce the margin spaced used for groups or subsets of the summary change markers shown in a particular display window.

The method 411 may continue on to block 441 with receiving an indication that one of the summary change markers has been selected (e.g., the marker may be selected using a mouse click or mouse hover activity). If no selection is made, then the method 411 may return to block 437 and display the summary change markers.

If a marker is selected, as determined at block 441, then the method 411 may include transmitting information to a receiving entity to enable displaying a summary text description of the change type proximate to the change associated with the one of the summary change markers at block 445. In this way, selecting a summary change marker, perhaps by clicking on the change marker using a mouse, results in displaying the content that has been changed, and a summary description of the change that has been made. The method 411 may then include returning to block 425.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Figure 5:
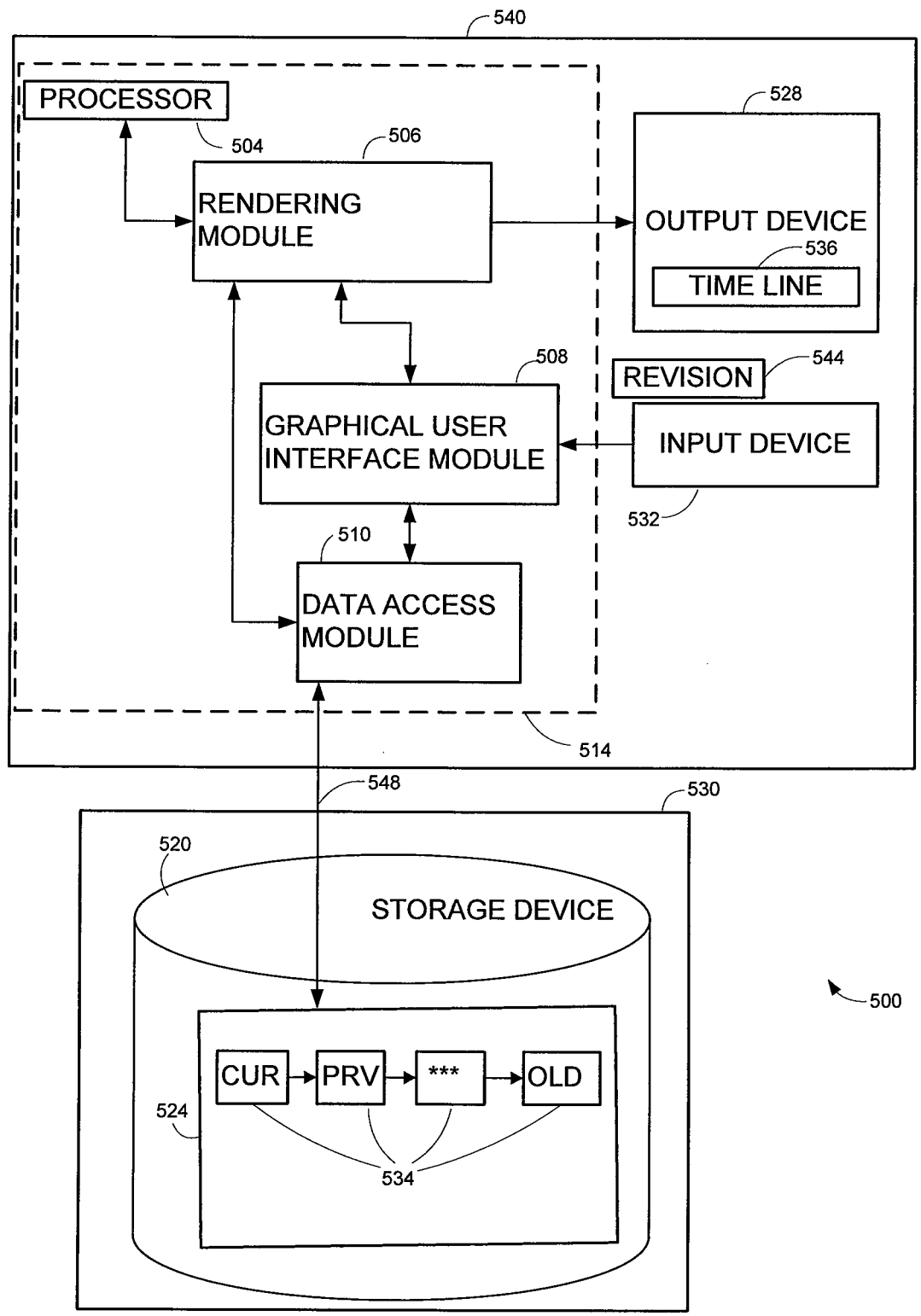
FIG. 5 is a block diagram of apparatus and systems according to various embodiments.

FIG. 5 is a block diagram of a system 500 according to various embodiments. The system 500 may include a number of modules such as one or more processors 504, a rendering module 506, a GUI module 508 and a data access module 510. The rendering module 506 and the GUI module 508 may take the form of an integral module, or exist a separate modules, as shown. These modules may be associated within a machine 514, such as a personal digital assistant (PDA), laptop computer, personal computer, workstation, or server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 to access a storage device 520, such as a database, a memory, a disk, or other storage device. The storage device 520 may serve to contain one or more items of electronic content 524. The data access module 510 may operate to read from and/or write to the electronic content 524 and may provide reading and writing services for the benefit of other system modules, including the GUI 508, the processor 504, and the rendering module 506. The electronic content 524 may include one or more content elements 534, such as various versions of a document, including the current version CUR, the previous version PRV, and the oldest version OLD.

The data access module 510 may be present in some embodiments, and absent in others. When present, the data access module 510 may operate as a mediator between the various components of the system 500 and the electronic content 524. For example, the storage device 520 may be included in a remote server 530.

The rendering module 506 may be operably coupled to an output device 528, such as a display screen, printer, or loudspeaker, among others. This output device 528 may be used for presenting renderings of content elements 534. Rendering may take the form of displaying the content elements 534, a time line 536, indications of selected content elements 534, and changes between the elements, as shown in FIGS. 1-2.

A GUI module 508 may be operably connected to the rendering module 506 and the data access module 510. The rendering module 506 may comprise a portable document format processing program in some embodiments.

The GUI module 508 may receive input from input devices 532 (e.g., a keyboard, a mouse, a trackball, voice recognizer, touch pad, touch screen, etc.), including user input comprising a "Save" command to save a revision 544 of the electronic content 524 in response to the GUI presented by an electronic content reviewing application. Thus, many embodiments may be realized.

For example, a system 500 to display electronic content version history, and changes between the versions, may comprise an output device 528 in the form of a display, and a storage device 520 to store a plurality of versions of electronic content 524, including a first version newer than a second version (e.g., the current version CUR may be chosen as the first version, and the previous version PRV may be chosen as the second version).

The system 500 may include a rendering module 506 to display, as part of a graphical user interface on the display, a time line 536 comprising a plurality of version indicators corresponding to the plurality of versions. Selection indicators and changes between the first version and the second version may be displayed at the same time as the time line, as described previously. The system 500 may comprise a workstation, or some other set of components, that operates to display the changes between the content elements 534 (e.g., versions of the electronic content 524).

In some embodiments, the system 500 may comprise a server device 530 including the storage device 520, and a client device 540 to couple to the server device 530 via a network 548, the client device 540 including the display (e.g., as part of the output device 528). The server device 530 may transmit a variety of information to the client device 540 to enable the display of various visual elements, as described with respect to FIGS. 3 and 4.

In some embodiments, the rendering module 506 comprises a word processing document application program. The system 500 may comprise a processor 504 to execute the word processing application program to display the electronic content 524 as one or more paginated documents, along with the time line 536 (e.g., perhaps a substantially horizontal time line), via the graphical user interface module 508.

Figure 6:
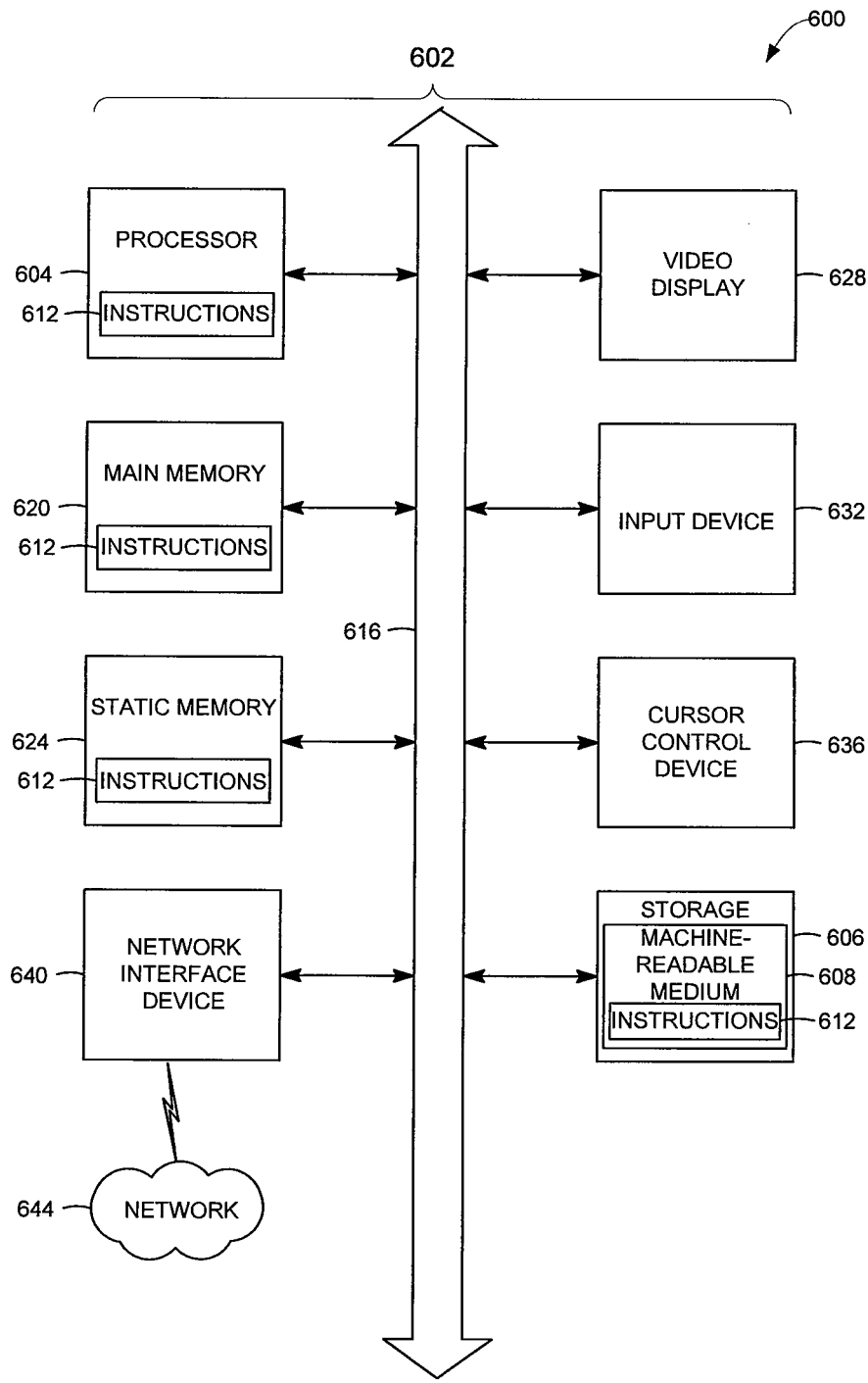
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

Machine 602 may take the form of a computer system having a processor 604 coupled to a number of components directly, and/or using a bus 616. Thus, the machine 602 may be similar to or identical to the system 500 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., the HyperText Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. For example, some embodiments may comprise a machine-readable medium having instructions stored therein for causing a machine to implement a method that comprises displaying a time line comprising a plurality of version indicators corresponding to a plurality of versions of electronic content including a first version newer than a second version. The time line may include a first selection indicator to indicate selection of the first version and a second selection indicator to indicate selection of the second version. At substantially the same time as the time line and the first and second selection indicators are displayed on the display, the instructions may cause the machine to also display at least a portion of a plurality of changes between the first version and the second version.

In some embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

FIG. 7 illustrates tracking changes between multiple versions along a file revision history time line according to various embodiments 700, 702, 704. In the first embodiment 700, the cursor 152 is shown hovering near a version of the document that was recorded on the previous day, so that the changes between the first version 158 (in this case the most recently recorded version of the document) and the second version 160 (in this case the document as it existed five recorded versions ago) refer to the changes between the version saved at 10:01 am of today, and 11:11 am of yesterday.

Information describing the time, date, and author of the first version 158 is shown above the time line 104, while the information describing the time, date, and author of the second version 160 is shown below the time line 104. Using selection activity in conjunction with the cursor 152 location (e.g., mouse-over actions combined with a click command), each version 158, 160 can be dynamically selected, one at a time. The specific versions of the document ultimately selected for tracking are shown via the circle version indicators 278.

For example, in the second embodiment 702, the cursor 152 is shown hovering near a version of the document that was recorded later in the previous day than the second version 160 selected in the first embodiment 700, so that the changes between the first version 158 (in this case the most recently recorded version of the document) and the second version 160 (in this case the document as it existed two recorded versions ago) refer to the changes between the version saved at 10:01 am of today, and 2:07 pm of yesterday.

In the third embodiment 704, the cursor 152 is shown hovering near a version of the document that was recorded some days before the second version 160 selected in the second embodiment 702, so that the changes between the first version 158 (in this case the document as it existed two recorded versions ago) and the second version 160 (in this case the document as it existed eight recorded versions ago) refer to the changes between the version saved at 2:07 pm yesterday, and 8:05 am Monday (some days before "yesterday"). Other versions may be selected.

Implementing the apparatus, systems, and methods of the various embodiments may provide the ability to more easily and quickly select for viewing the changes that have occurred between specific versions of electronic content. When an indication of the selected versions is displayed in conjunction with the changes, reviewers may be able to more efficiently conduct document editing functions. The number of editing mistakes may be reduced, and user satisfaction may be increased.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method, comprising:
   transmitting information to a receiving entity to enable displaying a time line of a plurality of version indicators corresponding to a plurality of versions of electronic content, the plurality of versions comprising a first version that is newer than a second version;
   detecting selection of a first selection indicator to indicate selection of the first version and selection of a second selection indicator to indicate selection of the second version;
   transmitting information to the receiving entity to enable displaying, at substantially a same time as the displaying of the plurality of version indicators and the first and second selection indicators, a portion of a plurality of changes between the first version and the second version of the electronic content; and
   transmitting information to the receiving entity to enable displaying a reversible summary change marker corresponding to a change of the plurality of changes, the reversible summary change marker selectable to toggle between undoing and redoing the change.

2. The method of claim 1, further comprising:
   transmitting information to the receiving entity to enable displaying at least one of the first selection indicator or the second selection indicator in conjunction with information indicating at least one of an associated personal identity or a save time.

3. The method of claim 2, further comprising:
   transmitting information to the receiving entity to dynamically display the information associated with a selected one of the plurality of versions as cursor hover activity proximate to the selected one of the plurality of versions is detected.

4. The method of claim 1, wherein the displaying of the plurality of version indicators comprises:
   displaying the plurality of version indicators as a substantially linear arrangement of the plurality of version indicators, each one of the plurality of version indicators comprising a substantially similar shape that is spaced apart from others of the plurality of version indicators.

5. The method of claim 1, further comprising:
   transmitting information to the receiving entity to enable displaying a next change selection indicator to receive display selections of a proximate change in the electronic content that comprises one of a prior change or a subsequent change with respect to a current change displayed as part of the portion.

6. The method of claim 1, further comprising:
transmitting information to the receiving entity to enable displaying an indication of content markup associated with the electronic content forming part of the portion.

7. The method of claim 1, further comprising:
selecting from the plurality of versions, as the first version, a most recent version of the plurality of versions; and
selecting from the plurality of versions, as the second version, a version last-viewed by a current user.

8. The method of claim 1, wherein the electronic content comprises a document.

9. A system, comprising:
a display;
a storage device to store a plurality of versions of electronic content, including a first version newer than a second version;
a rendering module to display, as part of a graphical user interface on the display, a time line comprising a plurality of version indicators corresponding to the plurality of versions, a first selection indicator to indicate selection of the first version and a second selection indicator to indicate selection of the second version, and, at substantially a same time as the time line and the first and second selection indicators are displayed on the display, to display a portion of a plurality of changes between the first version and the second version, and
the rendering module further to transmit information to the receiving entity to enable displaying a reversible summary change marker corresponding to a change of the plurality of changes, the reversible summary change marker selectable to toggle between undoing and redoing the change.

10. The system of claim 9, further comprising:
a server device including the storage device; and
a client device to couple to the server device via a network, the client device including the display.

11. The system of claim 9, wherein the rendering module comprises a word processing document application program, the system further comprising:
a processor to execute the word processing application program to display the electronic content as one or more paginated documents, along with the time line as a substantially horizontal time line, via the graphical user interface.

12. A non-transitory machine-readable storage device having instructions stored therein for causing a machine to implement operations comprising:
transmitting information to a receiving entity to enable displaying a time line comprising a plurality of version indicators corresponding to a plurality of versions of electronic content, the plurality of versions comprising a first version newer than a second version;
transmitting information to the receiving entity to enable displaying a first selection indicator to indicate selection of the first version and a second selection indicator to indicate selection of the second version;
transmitting information to the receiving entity to enable displaying, at substantially a same time as the time line and the first and second selection indicators, a portion of a plurality of changes between the first version and the second version, and
transmitting information to the receiving entity to enable displaying a reversible summary change marker corresponding to a change of the plurality of changes, the reversible summary change marker selectable to toggle between undoing and redoing the change.

13. The non-transitory machine-readable storage device of claim 12, wherein the operations further comprise comprises:
transmitting information to the receiving entity to enable displaying a different summary change marker for each change in the portion, the change marker to indicate, via an icon, a type of content change.

14. The non-transitory machine-readable storage device of claim 12, wherein the operations further comprise comprises:
receiving a toggle change selection associated with one of the different summary change markers to undo a change represented by the one of the different summary change markers.

15. A non-transitory machine-readable storage device having instructions stored therein for causing a machine to implement operations comprising:
displaying a time line comprising a plurality of version indicators corresponding to a plurality of versions of electronic content including a first version newer than a second version, the time line including a first selection indicator to indicate selection of the first version and a second selection indicator to indicate selection of the second version;
at substantially a same time as the time line and the first and second selection indicators are displayed on the display, displaying at least a portion of a plurality of changes between the first version and the second version and
transmitting information to the receiving entity to enable displaying a reversible summary change marker corresponding to a change of the plurality of changes, the reversible summary change marker selectable to toggle between undoing and redoing the change.

* * * * *